(12) United States Patent
Watanabe

(10) Patent No.: US 12,744,381 B2
(45) Date of Patent: Sep. 22, 2026

(54) ENERGY RESOURCE CONTROL METHOD, CONTROL DEVICE, AND RECORDING MEDIUM

(71) Applicant: Panasonic Intellectual Property Management Co., Ltd., Osaka (JP)

(72) Inventor: Kenichi Watanabe, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 343 days.

(21) Appl. No.: 18/686,331

(22) PCT Filed: Aug. 26, 2022

(86) PCT No.: PCT/JP2022/032208

§ 371 (c)(1),
(2) Date: Feb. 23, 2024

(87) PCT Pub. No.: WO2023/042642

PCT Pub. Date: Mar. 23, 2023

(65) Prior Publication Data

US 2026/0135386 A1 May 14, 2026

(30) Foreign Application Priority Data

Sep. 16, 2021 (JP) ................................ 2021-150915

(51) Int. Cl.
*H02J 3/14* (2026.01)
*H02J 3/32* (2006.01)
*H02J 105/52* (2026.01)

(52) U.S. Cl.
CPC *H02J 3/14* (2013.01); *H02J 3/32* (2013.01); *H02J 2105/52* (2026.01)

(58) Field of Classification Search
CPC ............ H02J 3/14; H02J 3/32; H02J 2105/52
See application file for complete search history.

(56) References Cited

U.S. PATENT DOCUMENTS

2004/0070280 A1* 4/2004 Nakata ..................... H02J 3/32 307/69
2014/0347016 A1 11/2014 Becker et al.
(Continued)

FOREIGN PATENT DOCUMENTS

JP 2002-010532 A 1/2002
JP 2012-010495 A 1/2012
(Continued)

OTHER PUBLICATIONS

International Search Report dated Nov. 8, 2022 issued in International Patent Application No. PCT/JP2022/032208, with English translation.

(Continued)

*Primary Examiner* — Zhipeng Wang
(74) *Attorney, Agent, or Firm* — Rimon P.C.

(57) ABSTRACT

An energy resource control method includes: generating a control command for controlling one or more energy resources; setting a restoration state for the one or more energy resources at or after an ending time of the one power service among the two or more power services, and generating a state restoration command for controlling the one or more energy resources in the restoration state set; and sending the generated state restoration command to the one or more energy resources after sending the generated control command to the one or more energy resources. In the generating of the state restoration command, the state restoration command is generated for an energy resource, among the one or more energy resources, that is not participating in the other power service at the ending time.

13 Claims, 6 Drawing Sheets

(56) References Cited

U.S. PATENT DOCUMENTS

| | | | | |
|---|---|---|---|---|
| 2015/0012149 | A1 | 1/2015 | Behrangrad | |
| 2019/0157877 | A1* | 5/2019 | Nakamura | H02J 3/12 |
| 2019/0252915 | A1* | 8/2019 | Nakamura | H02J 3/38 |

FOREIGN PATENT DOCUMENTS

| | | | |
|---|---|---|---|
| JP | 2014-527789 | A | 10/2014 |
| JP | 2018-019475 | A | 2/2018 |
| JP | 2019-213364 | A | 12/2019 |
| JP | 6880043 | B2 | 6/2021 |
| WO | 2014/013740 | A1 | 1/2014 |
| WO | 2014/076960 | A1 | 5/2014 |
| WO | 2018/003408 | A1 | 1/2018 |

OTHER PUBLICATIONS

"Guidelines for Energy Resource Aggregation Business", Agency for Natural Resources and Energy, Ministry of Economy, Trade and Industry, [URL] https://www.meti.go.jp/press/2020/06/20200601001/20200601001-1.pdf, Mar. 30, 2015, with its partial English translation.

Extended European Search Report received in the counterpart European patent application No. 22869789.2, dated Jan. 7, 2025.

* cited by examiner

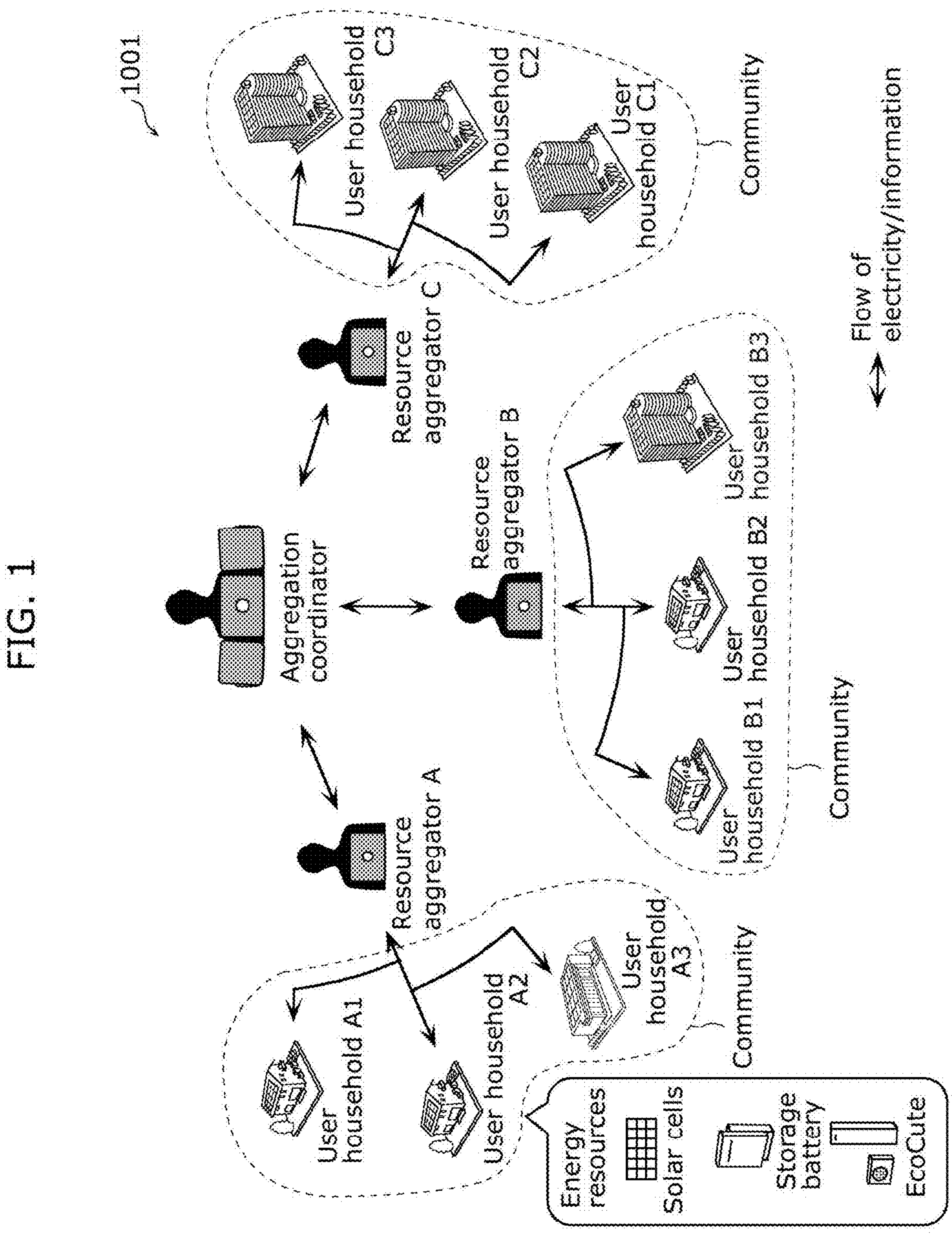
FIG. 1
1001
Aggregation coordinator
Resource aggregator A
Resource aggregator B
Resource aggregator C
User household A1
User household A2
User household A3
User household B1
User household B2
User household B3
User household C1
User household C2
User household C3
Community
Community
Community
Energy resources
Solar cells
Storage battery
EcoCute
Flow of electricity/information 1
10
Energy resource control device
20
30
40
50

Figure 3:
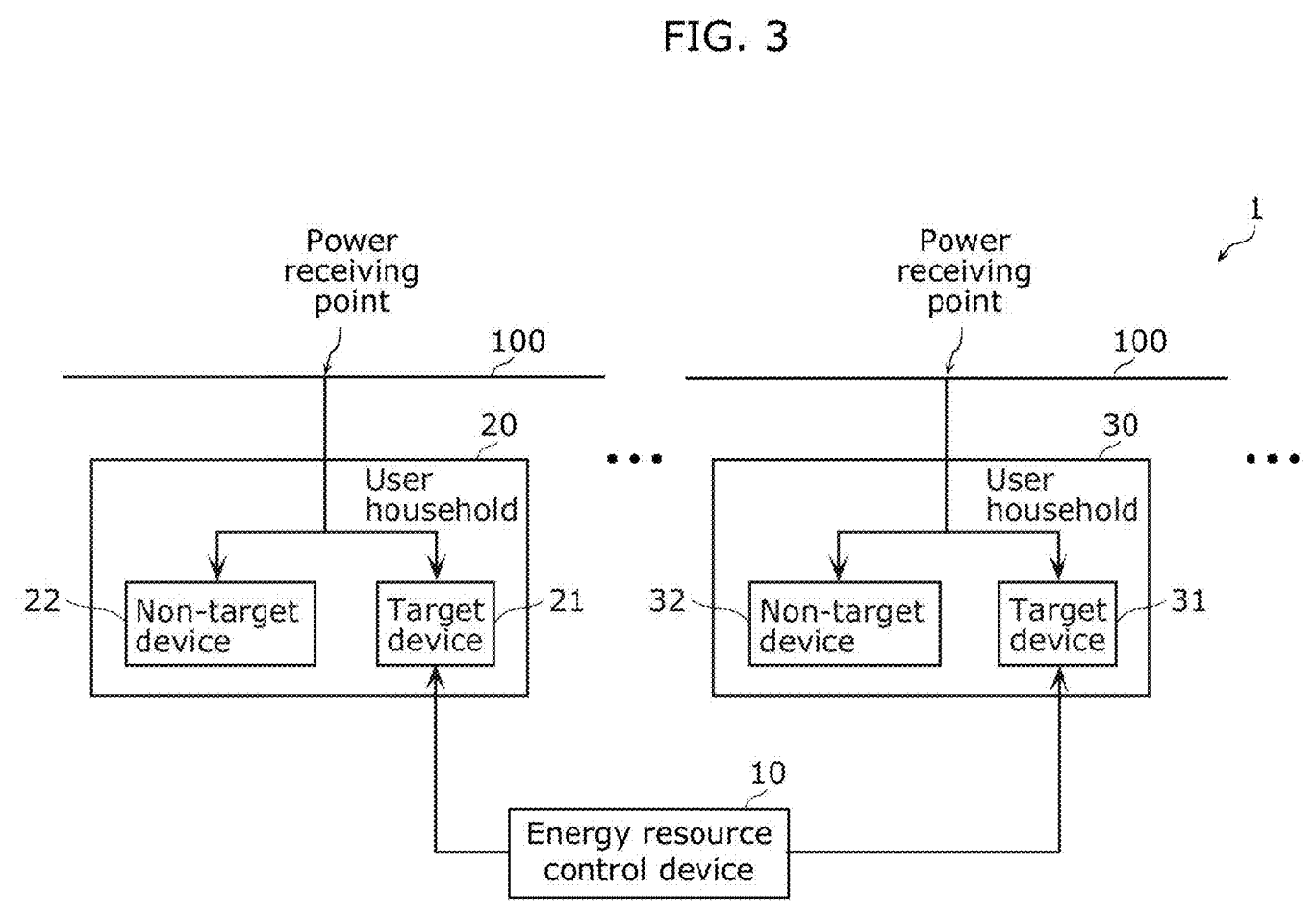

Power receiving point

100

User household

20

Target device

21

Non-target device

22

Power receiving point

100

User household

30

Target device

31

Non-target device

32

Energy resource control device

10
Energy resource control device
11
Obtainer
12
Command generator
13
Outputter
14
Storage
Measurement data
Control command, state restoration command

ENERGY RESOURCE CONTROL METHOD, CONTROL DEVICE, AND RECORDING MEDIUM

CROSS-REFERENCE OF RELATED APPLICATIONS

This application is the U.S. National Phase under 35 U.S.C. § 371 of International Patent Application No. PCT/JP 2022/032208, filed on Aug. 26, 2022, which in turn claims the benefit of Japanese Patent Application No. 2021-150915, filed on Sep. 16, 2021, the entire disclosures of which Applications are incorporated by reference herein.

TECHNICAL FIELD

The present invention relates to an energy resource control method, a control device, and a recording medium.

BACKGROUND ART

As the challenges of conventional large-scale and centralized energy systems have recently become apparent and the introduction and expansion of renewable energy has progressed, the transition to a decentralized energy system that utilizes energy resources that are relatively small and dispersed throughout the region is progressing. The introduction of energy resources to user households, including cogeneration such as solar power generation or household fuel cells, storage batteries, electric vehicles, and negawatts (electricity saved), continues to progress as well.

While these individual energy resources, such as homes or factories, are small in scale, a system and concept known as a "Virtual Power Plant" (VPP) has been proposed in which the resources are aggregated through advanced energy management technology using the Internet of Things (IOT) and are then controlled remotely in an integrated manner. This balances the supply and demand of power and has the resources function as if they were a single power plant.

An energy control system using the VPP system includes aggregators that control user household energy resources and distributed energy resources in an integrated manner. An aggregator operates energy resources under desired control conditions by sending power commands for operating the energy resources of user households under control conditions which conform to the power service in which those user households are participating.

PTL 1 discloses a technique for sending a restoration operation message (a state restoration command) to an energy resource for a user household when operations under such desired control conditions are to be terminated. This makes it possible for the energy resource that received the restoration operation message to terminate control under the desired control conditions and, for example, to operate under the operating conditions that were in effect prior to the desired control conditions.

CITATION LIST

Patent Literature

[PTL 1] Japanese U.S. Pat. No. 6,880,043

SUMMARY OF INVENTION

Technical Problem

However, with the technique described in PTL 1, when a user household is participating in a plurality of power services, a situation may arise in which the control under the desired control conditions cannot be terminated properly.

Accordingly, the present invention provides an energy resource control method, control device, and recording medium capable of appropriately terminating control under desired control conditions.

Solution to Problem

An energy resource control method according to one aspect of the present embodiment is an energy resource control method for providing two or more power services for adjusting a power value of one or more energy resources to a target power value, the two or more power services including one power service and an other power service different from the one power service. The energy resource control method includes: generating a control command for controlling the one or more energy resources; setting a restoration state for the one or more energy resources at or after an ending time of the one power service among the two or more power services, and generating a state restoration command for controlling the one or more energy resources in the restoration state set; and sending the state restoration command generated in the generating of the state restoration command to the one or more energy resources after sending the control command generated in the generating of the control command to the one or more energy resources. In the generating of the state restoration command, the state restoration command is generated for an energy resource, among the one or more energy resources, that is not participating in the other power service at the ending time.

A control device according to one aspect of the present invention is a control device that provides two or more power services for adjusting a power value of one or more energy resources to a target power value, the two or more power services including one power service and an other power service different from the one power service. The control device includes: a control command generator that generates a control command for controlling the one or more energy resources; a state restoration command generator that sets a restoration state for the one or more energy resources at or after an ending time of the one power service among the two or more power services, and generates a state restoration command for controlling the one or more energy resources in the restoration state set; and a command sender that sends the state restoration command generated by the state restoration command generator to the one or more energy resources after sending the control command generated by the control command generator to the one or more energy resources. The state restoration command generator generates the state restoration command for an energy resource, among the one or more energy resources, that is not participating in the other power service at the ending time.

A recording medium according to one aspect of the present invention is a non-transitory computer-readable recording medium having recorded thereon a program for causing a computer to execute the above-described energy resource control method.

Advantageous Effects of Invention

According to one aspect of the present invention, an energy resource control method and the like capable of appropriately terminating control under desired control conditions can be realized.

BRIEF DESCRIPTION OF DRAWINGS

FIG. 1 is a diagram illustrating an overview of an energy control system according to a comparative example.

FIG. 3 is a second diagram illustrating an overview of the energy control system according to the embodiment.

FIG. 4 is a block diagram illustrating the functional configuration of an energy resource control device according to the embodiment.

DESCRIPTION OF EMBODIMENTS

Circumstances Leading to the Present Invention

Figure 2:
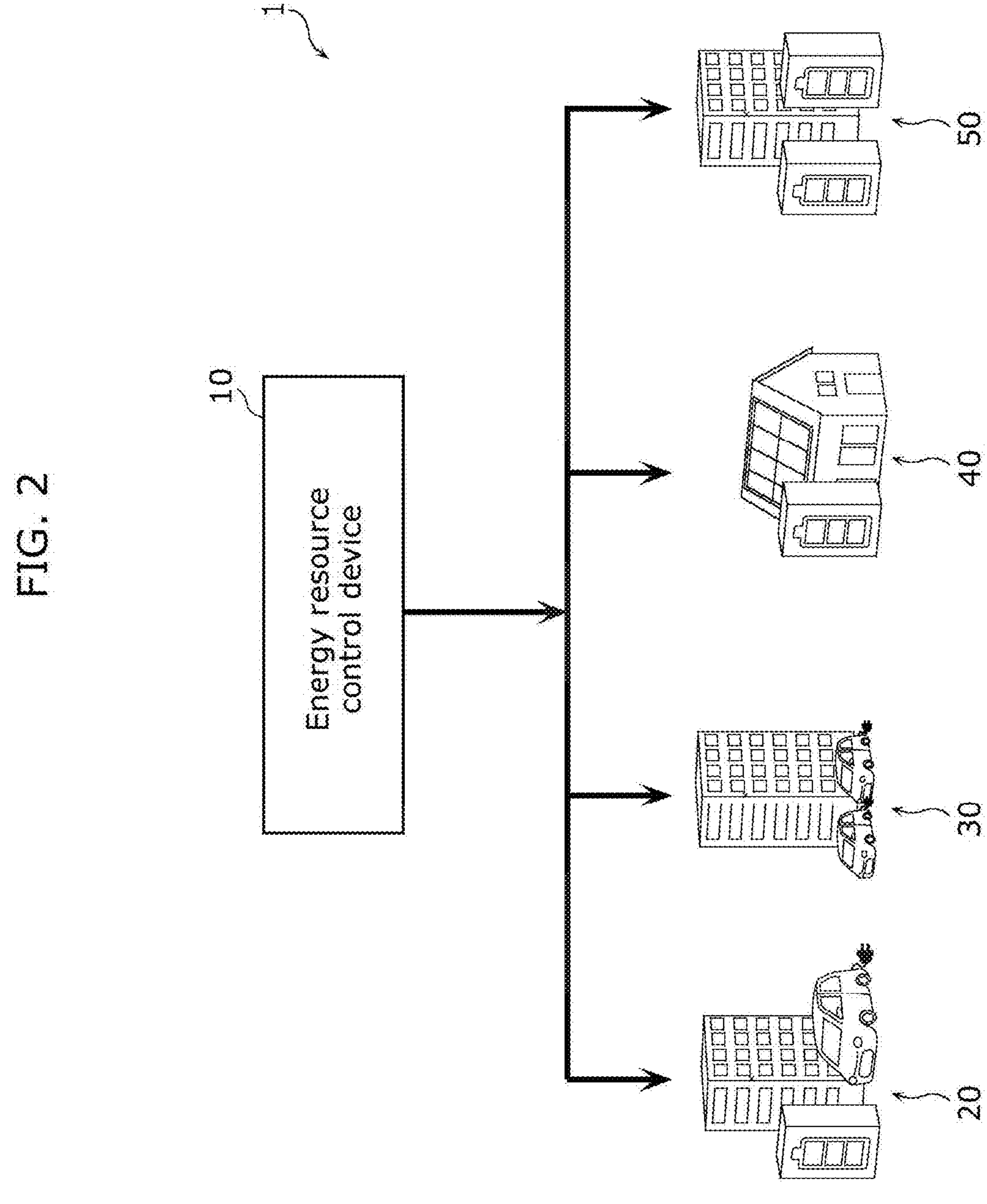
FIG. 2 is a first diagram illustrating an overview of an energy control system according to an embodiment.

Before describing the present invention, the circumstances leading to the present invention will be described with reference to FIG. 1. FIG. 1 is a diagram illustrating an overview of energy control system 1001 according to a comparative example. FIG. 1 is a diagram illustrating an overview of a Virtual Power Plant (VPP). Note that a VPP controls power generation equipment and energy resources distributed throughout a power grid or below a power receiving point in an integrated manner, similar to a single power plant (a virtual power plant).

As illustrated in FIG. 1, energy control system 1001 includes communities, resource aggregators, and an aggregation coordinator. Note that the numbers of communities, resource aggregators, and aggregation coordinators included in energy control system 1001 are not limited to the numbers illustrated in FIG. 1. Resource aggregators and aggregation coordinators may also be referred to collectively as "power aggregators" or simply "aggregators". In the following, resource aggregators and aggregation coordinators will be referred to collectively as "aggregators". The aggregation coordinator may also be referred to as a "power aggregator" or simply an "aggregator". The power aggregator or aggregator corresponds to a provisional specified wholesale supplier or specified wholesale supplier.

Each of community is constituted by a plurality of user households. FIG. 1 illustrates an example in which three communities are formed, constituted by user households A1 to A3, user households B1 to B3, and user households C1 to C3, respectively. A single community is constituted by at least one user household managed by a resource aggregator, for example. Resource aggregator A manages power supply-demand for user households A1 to A3, resource aggregator B manages power supply-demand for user households B1 to B3, and resource aggregator C manages power supply-demand for user households C1 to C3. Each of resource aggregators A to C manages the power supply-demand for one or more different user households. Note that the number of user households constituting a community is not limited to three. Furthermore, user households within a community need not be geographically close to each other.

At least one of the plurality of user households may have energy resources such as solar cells (power generation equipment), storage batteries (storage battery equipment), electric water heaters (hot water storage equipment) using heat pump technology such as EcoCute (registered trademark), and the like.

Resource aggregators and aggregation coordinators are business operators that control energy resources on the user household side, distributed energy resources, and the like in an integrated manner, and provide energy services from virtual power plants (VPPS).

A resource aggregator is provided in each community, for example, to provide power control for a plurality of user households within the community. The resource aggregator and the plurality of user households exchange various types of information.

For example, information pertaining to an amount of power generated by power generation equipment is sent from the user household that has the power generation equipment to the resource aggregator. In addition, information pertaining to a power reduction amount allocated to the user household is sent from the resource aggregator to the user household.

The aggregation coordinator aggregates the power amounts controlled by the resource aggregator and conducts adjusting power transactions with business operators such as electricity distribution businesses, retail electricity businesses, and the like.

In this energy control system 1001, there are situations where the aggregator controls the energy resources held by user households under the desired control conditions based on requests from a general electricity distribution business, a retail electricity business, or the like, or from user households. The desired control conditions are conditions based on power services such as peak shaving, demand response (DR), and the like, for example.

The aggregator may send power command messages to a single energy resource for operating under control conditions based on a plurality of power services. The aggregator may, for example, send power command messages for operating the energy resource under control conditions for achieving two power services, namely peak shaving and demand response. Note that the power services are not limited to peak shaving and demand response, and may be services related to power provided in a predetermined country, a predetermined region, or the like.

At this time, if the aggregator sends a state restoration message to terminate one of the two power services, a situation may arise in which both power services are terminated, i.e., the control under the desired control conditions cannot be terminated properly. This may occur, for example, when the aggregator is sending a single power command message integrating two power services.

Accordingly, the inventors of the present application diligently studied control methods and the like for energy resources capable of appropriately terminating control under desired control conditions, and devised the control method and the like for energy resources described hereinafter.

"Peak shaving" (power demand peak shaving) refers to suppressing the use (consumption) of power by user households at times of peak power demand. In general, peak shaving is a power service that adjusts the peak power of a user household to be no greater than a predetermined power value (an example of a target power value). It is necessary for power generation equipment to be installed on the power supply side at a scale commensurate with peak power demand, and thus peak shaving in power demand is important. As such, contracted power and basic rates are often set at a maximum demand power per unit of time, such as 30 minutes, and peak shaving is an electricity service, mainly for user households, which provides the benefit of reduced electricity costs on the user household side.

Control for peak shaving is performed over a longer period of time than, for example, control for demand response. Control for peak shaving is performed constantly, 24 hours a day throughout the year, for example.

Demand response (power demand response) refers to stabilizing the overall power supply-demand balance, achieving the same amount of power at the same time according to planned values, and the like by controlling the energy resources of user households to change power demand patterns. In addition to direct control of energy resources, demand response also includes indirect control, such as setting power rates higher during predetermined periods of power demand (e.g., peak hours) than during non-peak hours, retail electricity businesses providing incentives (e.g., monetary rewards) to user households for reduced power consumption, and the like. Demand response is therefore a power service that adjusts the power for a user household to a predetermined power value (an example of a target power value) during such a predetermined period.

Control for demand response is performed over a shorter period of time than, for example, control for peak shaving. Control for demand response is performed, for example, only during a few hours of the day when power demand or supply is high (e.g., from 12:00 to 15:00 or the like). Demand response is, for example, a power service mainly for general electricity distribution businesses and retail electricity businesses. General distribution businesses procure adjusting power from aggregators and the like via the market or through relative contracts to adjust power supply-demand and the like, whereas retail electricity businesses procure adjusting power to avoid imbalances and the like.

Note that the following embodiment will describe comprehensive or specific examples of the present disclosure. The numerical values, shapes, constituent elements, arrangements and connection states of constituent elements, steps, orders of steps, and the like in the following embodiments are merely examples, and are not intended to limit the present invention. Additionally, of the constituent elements in the following embodiment, constituent elements not denoted in the independent claims will be described as optional constituent elements.

Note also that the drawings are schematic diagrams, and are not necessarily exact illustrations. Configurations that are substantially the same are given the same reference signs in the drawings, and redundant descriptions may be omitted or simplified.

Additionally, in the present specification, terms indicating relationships between elements, such as "the same", numerical values, and numerical value ranges do not express the items in question in the strictest sense, and also include substantially equivalent ranges, e.g., differences of approximately several percent (e.g., approximately 10%), as well.

Embodiment

Figure 4:
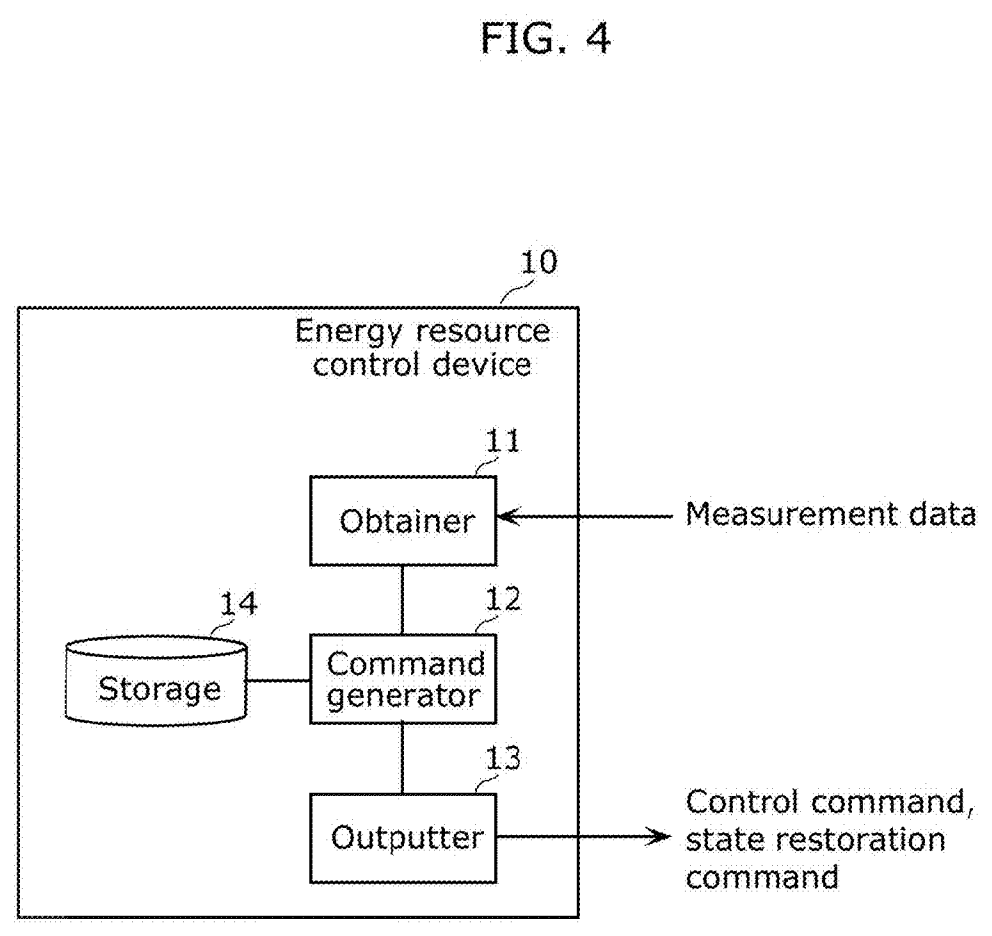

An energy resource control method and the like according to the present embodiment will be described hereinafter with reference to FIGS. 2 to 6. cl 1. Configuration of Energy Control System First, the configuration of an energy control system according to the present embodiment will be described with reference to FIGS. 2 to 4. FIG. 2 is a first diagram illustrating an overview of energy control system 1 according to the present embodiment. FIG. 3 is a second diagram illustrating an overview of energy control system 1 according to the present embodiment. FIG. 4 is a block diagram illustrating the functional configuration of energy resource control device 10 according to the present embodiment. For the sake of simplicity, only user households 20 and 30 are illustrated in FIG. 3.

As illustrated in FIGS. 2 and 3, energy control system 1 according to the present embodiment includes energy resource control device 10 and a plurality of user households 20 to 50 (also referred to as a "plurality of user households 20 and the like" hereinafter). Energy control system 1 is an energy control system in which energy resource control device 10 controls power demand for energy resources of the plurality of user households 20 and the like.

Here, "energy resource" refers to a device capable of generating and/or consuming energy (power) and obtaining commands (messages) from energy resource control device 10, and will also be referred to as a "target device" hereinafter. Note that the term "target device" will also be used when the command is obtained via a controller or the like (not shown). A device that is capable of generating and/or consuming energy (power) but is unable to obtain commands (messages) from energy resource control device 10 will also be referred to as a "non-target device" hereinafter.

Energy resource control device 10 is communicably connected to target devices (e.g., target devices 21 and 31) in the plurality of user households 20 and the like, wirelessly or over wires, and sends, to the target devices, power command messages (control commands) for performing control under desired control conditions, and state restoration messages (state restoration commands) for stopping control under the desired control conditions.

"Restoration" refers to a transition from a state in which energy resources are operated under the control of energy resource control device 10 to a state controlled through local control or the like. When a target device operating based on a control command from energy resource control device 10 obtains a state restoration command, the target device terminates the operations based on the control command, and enters a state where the target device cannot be controlled by energy resource control device 10 until the next control command is obtained. For example, if the target device is operating based on a control command from energy resource control device 10, the target device may be made incapable of operating in an operating state such as an automatic operation state or the like where local control is performed until a state restoration command is obtained.

Energy resource control device 10 is, for example, an information processing device (server device) of a resource aggregator. Energy resource control device 10 may interact with external servers such as servers of electricity distribution businesses, retail electricity businesses, and the like, servers of weather information distribution companies, servers of supply-demand adjustment markets, and the like, but these are not illustrated in the drawings.

As illustrated in FIG. 4, energy resource control device 10 includes obtainer 11, command generator 12, outputter 13, and storage 14. Energy resource control device 10 is realized in a computer having a communication interface for communicating with each target device, volatile memory serving as a temporary storage region for executing programs, input/output ports for sending and receiving signals, a processor that executes programs, and the like. The functions of energy resource control device 10 are realized by the processor executing programs.

Obtainer 11 obtains measurement data including at least one of data on the power (peak power) at a power receiving point of a user household facility (e.g., a residence) and input/output power of one or more target devices. Obtainer 11 may obtain the measurement data from each of the plurality of target devices, or may obtain the measurement data from a controller that controls the plurality of target devices. Obtainer 11 is configured including a communication interface, for example.

Note that the measurement data may include data on, for example, a power generation amount, a power storage amount, a hot water storage amount, a usage amount, an operation mode, and the like of the target device.

Note that the power data at the power receiving point of the user household facility is the power or power amount at a power receiving point with power system 100 in the facility (see FIG. 3). The power is, for example, a peak power supplied from power system 100 to that user household facility. In the case of user household 20, the power is the maximum value of the power used in user household 20. The peak power can be obtained, for example, by a sensor that measures the power supplied from power system 100. The power and the power amount are, for example, time-series data of a forward flow or a reverse flow from power system 100 to the user household facility.

Note that input/output power of the one or more target devices includes power supplied from power system 100 to the one or more target devices (e.g., consumed or stored power), or power supplied by the one or more target devices (e.g., generated or discharged power). The power can be obtained by a sensor that measures the input or output power for each of the one or more target devices.

Note that the facility is not limited to a residence, and may be a building where a target device is installed, such as an apartment building, a building, a hospital, a school, or the like.

Command generator 12 generates various commands for controlling target devices. Command generator 12 generates the power command messages (control commands) and the state restoration messages (state restoration commands) described above. Command generator 12 generates the power command messages based on, for example, measurement data and contract details. Command generator 12 generates control commands for each of the one or more target devices in accordance with the details of contract for power between the user household where the target device is located and an aggregator, or commands from a general electricity distribution business, retail electricity business, or the like, for example.

Command generator 12 also generates state restoration commands based on inputs and outputs, the state, the contract details, and the like of the target device. Command generator 12 does not generate the state restoration commands uniformly for each of the one or more target devices, but instead generates the state restoration commands only for target devices, among the one or more target devices, that meet a predetermined condition. The predetermined condition is that at or after the point in time when one power service ends, the target device is not participating in another power service.

Command Generator 12 Is Realized by the Processor or the Like.

Outputter 13 outputs the command generated by command generator 12 to the target device corresponding to the command. Outputter 13 sends the command through wireless communication, for example. Outputter 13 is configured including a communication interface, for example. Outputter 13 is an example of a command sender.

Storage 14 stores various types of information used by command generator 12 to generate commands. Storage 14 stores information specifying the plurality of user households 20 and the like, service details pertaining to power demand under the contracts of the plurality of user households 20 and the like, and a list of target devices in the plurality of user households 20 and the like. Storage 14 may also store the measurement data obtained by obtainer 11, the commands generated by command generator 12, and the like. Storage 14 is realized by semiconductor memory or the like, for example, but is not limited thereto.

Referring again to FIGS. 2 and 3, each of the plurality of user households 20 and the like is a user household having one or more target devices (one or more energy resources) and which has a contract for being controlled by energy resource control device 10. The one or more target devices of the plurality of user households 20 and the like are controlled by energy resource control device 10 according to contract details.

Note that the plurality of user households 20 and the like may be user households included in a single group (community) (e.g., user households A1 to A3 and the like illustrated in FIG. 1), or may be user households included in different groups (e.g., user households A1, B1, C1 and the like illustrated in FIG. 1).

As illustrated in FIG. 3, user household 20 has target device 21 and non-target device 22, and user household 30 has target device 31 and non-target device 32. Note that the configurations of other user households 30, 40, and 50 are the same as those of user household 20 or 30, and will therefore not be described. Additionally, the numbers of target devices and non-target devices in each of the plurality of user households 20 and the like are not particularly limited, and may be at least two each.

Target devices 21 and 31 include secondary batteries such as solar cells (power generation equipment), storage batteries (storage battery equipment), electric vehicles, electric water heaters (hot water storage equipment) using heat pump technology such as EcoCute (registered trademark), devices such as air conditioners and refrigerators (load equipment), and the like. Each of target devices 21 and 31 is communicably connected to energy resource control device 10, either directly or via a controller or the like. Note that it is sufficient for energy control system 1 to include at least one target device. Note also that in the following, target device 21 may be described as "first target device 21", and target device 31 as "second target device 31", to identify the two.

Non-target devices 22 and 32 are devices that cannot be controlled by energy resource control device 10, and include hair dryers, hair clippers, and the like. Neither of non-target devices 22 and 32 has a communication function, for example. Note that it is conceivable that energy resource control device 10 does not control solar cells (power generation equipment), and the solar cells are non-target devices in such a case.

2. Operations of Energy Control System

Figure 5:
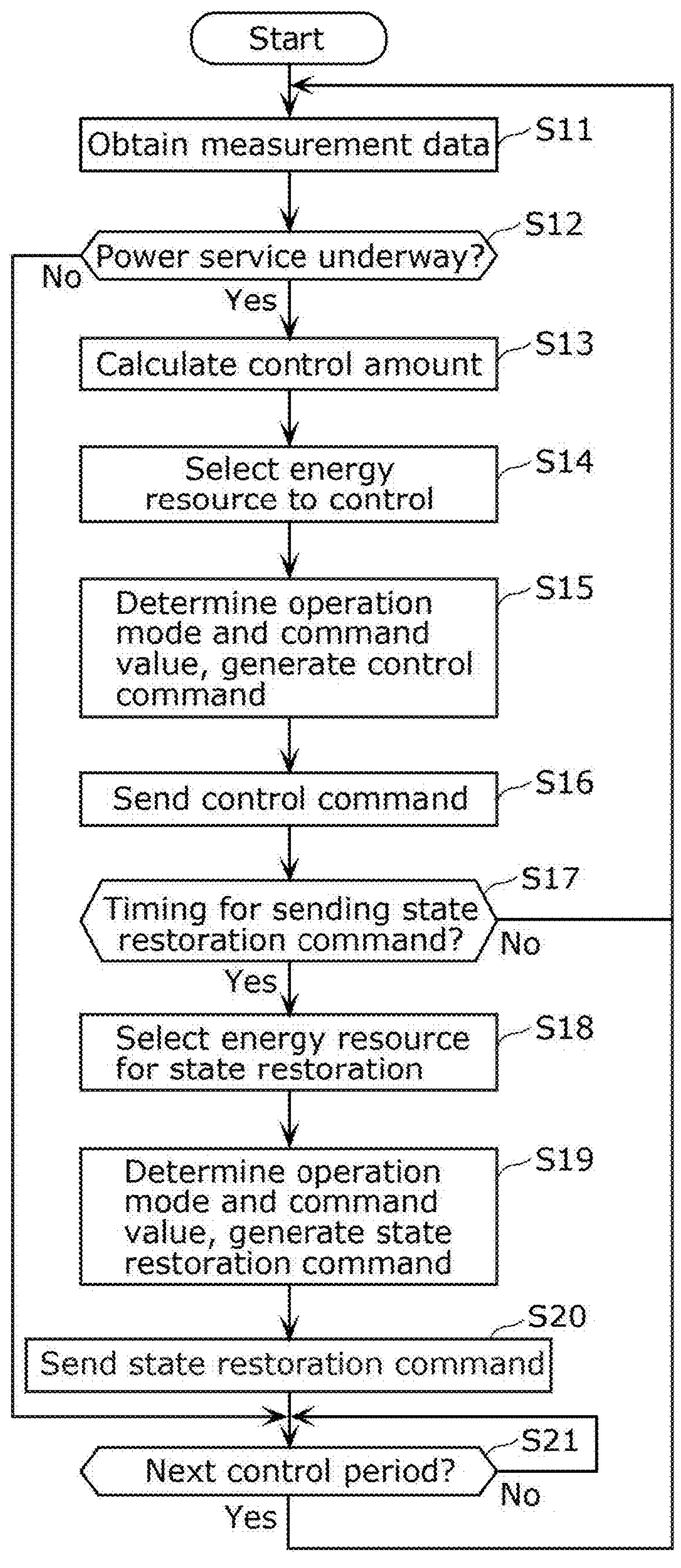
FIG. 5 is a flowchart illustrating operations performed by the energy resource control device according to the embodiment.

Operations of energy control system 1 configured as described above will be described next with reference to FIGS. 5 and 6. FIG. 5 is a flowchart illustrating operations of energy resource control device 10 (an energy resource control method) according to the present embodiment. Note that the plurality of target devices including target devices 21 and 31 may also be referred to as a "plurality of target devices 21 and the like" in the following. Furthermore, operations performed when reducing the amount of power used by the plurality of target devices 21 and the like will be described hereinafter. Additionally, the energy resource control method is a control method for providing one or more power services including one power service for adjusting a power value in the one or more target devices (the one or more energy resources) to a target power value.

As illustrated in FIG. 5, obtainer 11 obtains the measurement data from the plurality of target devices 21 and the like (S11). Obtainer 11 obtains the measurement data from target device 21 and the like installed in respective ones of the plurality of user households 20 and the like, regardless of the power service contract details of the plurality of user households 20 and the like. Step S11 is an example of receiving measurement data.

Obtainer 11 obtains the measurement data at predetermined time intervals, for example, but the timing of the obtainment is not limited thereto. The measurement data may also be obtained as steps S12 to S21 (described later) are being executed.

Obtainer 11 outputs the obtained measurement data to command generator 12. Command generator 12 may store the measurement data in storage 14.

Next, command generator 12 determines whether a power service is underway (S12). Command generator 12 makes the determination of step S12 based on whether the current time is included in a target period of the power service. If the power service is underway (Yes in S12), the sequence moves to step S13, whereas if the power service is not underway (No in S12), the sequence moves to step S21.

Next, if the power service is currently underway (Yes in S12), command generator 12 calculates a control amount (S13). The control amount is a value of the power or power amount that is calculated using the measurement data, for example. Command generator 12 calculates, as a control amount, an overall power reduction amount or increase amount in one or more user households 20 and the like managed by energy resource control device 10, on the basis of information based on the measurement data, and the details of the power service (e.g., an upper limit value of the amount of power used, a command value from an external server, and the like). For example, command generator 12 may calculate, on the basis of information based on the measurement data, a total amount of power usage in the plurality of user households 20 and the like, and calculate, as the control amount, the difference between the total amount of power usage (total usage) calculated and an amount of power usage allowed in the power service (allowable usage amount). Note that when the control is not needed, the control amount is 0.

The information based on the measurement data may include, for example, at least one of power at the power receiving point with power system 100 of the equipment in each of the plurality of user households 20 and the like (see FIG. 3), a total power at a plurality of power receiving points in which the equipment in each of the plurality of user households 20 and the like are aggregated, the input/output power of each of the one or more target devices installed in a facility, and total input/output power of each of the one or more target devices in the plurality of user households 20 and the like.

The power at the power receiving point is, for example, the power of the equipment, and the total power is, for example, the total value of the power of all the equipment. The input/output power is, for example, charging power and discharging power of target devices 21 and 31, and the total input/output power is, for example, the total value of charging power and discharging power in all the plurality of target devices 21 and the like.

The allowable power amount is the total value of the power amount that power system 100 can supply to the plurality of user households 20 and the like. For example, an allowable usage amount is set for each time period. The allowable power amount is, for example, a threshold (upper limit value) for the power amount that can be supplied from power system 100.

When there are a plurality of power services currently underway, command generator 12 calculates the control amount based on the allowable usage amount for each of the plurality of power services. Command generator 12 also calculates a control amount for each time period, for example. Any known method may be used for calculating the control amount.

Next, command generator 12 selects an energy resource (target device) to be controlled (S14). Command generator 12 selects one or more target devices installed in one or more user households participating in the power service currently underway as energy resources to be controlled, based on contract details and the like of the plurality of user households 20 and the like stored in storage 14.

Note that in step S14, a target device for which the power service cannot be implemented or implementation is limited need not be selected as an energy resource to be controlled. In other words, in step S14, a determination is made as to whether the target device is a target device for which the power service which is underway can be implemented, and only a target device for which the power service can be implemented may be selected as an energy resource to be controlled. For example, when reducing the amount of power supplied from power system 100, it is conceivable to control a secondary battery, which is an example of a target device, to discharge. Therefore, a secondary battery with a storage amount or discharge capacity of 0, or less than a predetermined value, need not be selected as an energy resource to be controlled. Target devices that are participating in the power service but that cannot be controlled by energy resource control device 10, and target devices installed in user households not participating in the power service, are excluded from the energy resources to be controlled.

Next, command generator 12 sets an operation mode and a command value for the selected energy resource such that the control amount calculated in step S13 is achieved, and generates a control command for operating in the operation mode and at the command value set for the selected energy resource (S15). In step S15, command generator 12 sets the allocation of command values for individual user households from the overall control amount (e.g., the reduction amount) of the one or more user households 20 and the like managed by energy resource control device 10. Step S15 is an example of generating a control command.

The control command is generated using the control amount, for example. In other words, the control command is generated using at least the measurement data, for example. To rephrase, command generator 12 generates the control command for controlling one or more target devices using at least the measurement data, for example. Command generator 12 may further generate the control command for controlling one or more target devices based on the power service underway.

The operation mode is a mode for operating the target device, and includes an energy saving mode, a power storage mode, a discharge mode, a boiling mode, cooling mode, and the like. In addition, the command value includes a power reduction amount, a power storage amount, a discharge amount, an allowable power amount, and the like, but is not limited thereto. The command value may be in units of W, Wh, A, Ah, or the like, but is not limited thereto. Command generator 12 assigns a command value to the selected energy resource such that the control amount is achieved. The control command is generated for each of the one or more target devices that meets a predetermined condition, for example. For energy resources for which only the operation mode can be set, or when it is sufficient to only control the operation mode to in standby, stopped, or the like, the control command is generated only for the operation mode. In other words, in this case, the control command need not include a command value or the like.

In this manner, command generator 12 functions as a control command generator that generates a control command. Command generator 12 outputs the generated control command to outputter 13.

Next, outputter 13 sends the control command obtained from command generator 12 to the one or more target devices or the controller (S16). Step S16 is an example of sending a command.

Next, command generator 12 determines whether the current time is a timing at which to send a state restoration command (S17). If the current time is a predetermined time, an ending time of the power service underway, or a period of time since the previous state restoration command was sent has passed a predetermined length of time, command generator 12 determines that the current time is the timing at which to send the state restoration command (Yes in S17), after which the sequence moves to step S18. If not, command generator 12 determines that the current time is not the timing at which to send a state restoration command (No in S17), after which the sequence moves to step S11 without selecting an energy resource for which the state is to be restored. The ending time of the power service underway also includes a time that is a predetermined period before the ending time of that power service (e.g., time t3 indicated in FIG. 6). The predetermined period here is set in advance based on, for example, the time required for the processing illustrated in FIG. 5, the time required for communication between energy resource control device 10 and the target device, and the like.

Next, if the current time is the timing at which to send a state restoration command (Yes in S17), command generator 12 selects an energy resource for which the state is to be restored (S18). Command generator 12 selects, as the energy resource for which the state is to be restored, one or more target devices installed in a user household for which the power service in which that user household is participating has ended.

Here, if a user household is participating in a plurality of power services, command generator 12 selects, as the energy resource for which the state is to be restored, one or more target devices installed in a user household for which all the plurality of power services have ended. For example, when a plurality of power services including a first power service are present, command generator 12 extracts, from the plurality of user households 20 and the like, a user household which is not participating in another power service different from the first power service at or after the ending time of the first power service, and selects one or more target devices installed in the extracted one or more user households as the energy resource for which the state is to be restored. In other words, command generator 12 does not select one or more target devices installed in a user household for which the other power service different from the first power service is underway at the ending time of the first power service as the energy resource for which the state is to be restored.

Note that not participating in the service includes at least one of a case where the user household in which an energy resource is installed is not subject to other power services (is not participating in other power services), and a case where the user household in which the energy resource is installed is subject to the other power service but the energy resource has no extra capacity (e.g., remaining capacity) and therefore cannot be controlled by energy resource control device 10.

Next, command generator 12 sets the restoration state of the one or more target devices at or after the ending time of the first power service among the plurality of power services, and generates a state restoration command for controlling the one or more target devices in the set restoration state. Specifically, command generator 12 sets the operation mode and command value to be used after restoration for the target device selected in step S18, and generates a state restoration command for operating using the set operation mode and command value (S19). Command generator 12 generates the state restoration command only for energy resources, among the one or more target devices, which do not participate in a power service different from the first power service after the ending time of the first power service, for example. In other words, command generator 12 does not generate state restoration commands uniformly for all the plurality of target devices. Command generator 12 does not generate state restoration commands for all of the one or more user households participating in the first power service. Step S19 is an example of generating a state restoration command. In addition, setting the operation mode and command value to be used after the restoration is an example of setting the restoration state. The command value may be in units of W, Wh, A, Ah, or the like, but is not limited thereto. Additionally, the command value may be, for example, a value (%) for a target remaining capacity or the like. Additionally, for energy resources for which only the operation mode can be set, or when it is sufficient to only control the operation mode to be in standby, stopped, automatic operation, or the like, the control command is generated only for the operation mode. In other words, in this case, the control command need not include a command value or the like.

For example, when providing a power service that adjusts the power at the power receiving point of the facility where the one or more target devices are installed to be no greater than a predetermined power value, energy resource control device 10 does not generate a state restoration command for the one or more target devices installed in that facility. The power service is what is known as “peak shaving”, and the power service is being provided continually. Accordingly, command generator 12 does not generate a state restoration command for one or more target devices installed in a user household that is under contract for the power service. In this manner, command generator 12 may determine, in step S19, whether to generate a state restoration command based on whether a user household, in which the selected target device is installed, is participating in a predetermined power service. Additionally, whether to generate a state restoration command may be determined based on whether a user household, in which the selected target device is installed, is participating in a predetermined power service and control pertaining to that power service is in effect.

Note that the restoration state is set as follows, for example. The restoration state is set according to the type of the target device and the like, for example.

For example, when one or more target devices include a secondary battery, command generator 12 may set at least one of a standby state, an automatic operation state, or a state opposite from the control command generated in step S15 as the restoration state for the secondary battery. The "standby state" is, for example, a state in which the secondary battery is not being charged or discharged, and control in response to a control command from energy resource control device 10 can be started. The "automatic operation state" is a normal operating state of the secondary battery, and is a state of operation based on, for example, pre-set schedule information or an algorithm. The automatic operation state can also be said to be a state of operation under conditions determined on the secondary battery side (e.g., by a controller), regardless of control commands from energy resource control device 10. Which state is to be used as the restoration state may be set in advance, for example, according to a contract or the like, or may be set in accordance with the state of the secondary battery during restoration.

The state opposite from the control command generated in step S15 is, for example, a state in which the secondary battery is charged, in a case where a control command for discharging the secondary battery was generated in step S15. Command generator 12 may further set the value of at least one of the input and output of the power in the restoration state (input/output power), and generate a state restoration command including the set value, when one or more target devices include a secondary battery. The value of the input is a charge amount, and the value of the output is a discharge amount, for example.

Additionally, if, for example, the one or more target devices include a device having a thermal storage function (e.g., an electric water heater), command generator 12 may set an automatic operation state in which local control is performed as the restoration state for that device, for example.

Additionally, if, for example, the one or more target devices include a device having a power generation function (e.g., a generator), command generator 12 may set an automatic operation state in which local control is performed as the restoration state for that device, for example.

In this manner, command generator 12 functions as a state restoration command generator that generates a state restoration command. Command generator 12 outputs the generated state restoration command to outputter 13.

Next, outputter 13 sends the state restoration command obtained from command generator 12 to the one or more target devices or the controller (S20). Outputter 13 sends at least one control command, among the control commands generated in step S15, to the one or more target devices, and then sends the state restoration command generated in step S19 to the one or more target devices. Step S20 is an example of sending a command.

Next, command generator 12 determines whether the current period is the next control period (S21). The control period is a period in which control commands are generated and sent, and is set in advance. The control period may be one minute, ten minutes, one hour, or the like, for example. For example, if the user household has joined a Real-Time Pricing (RTP) system in which the unit price of an electricity bill is changed in a short period of time, such as every 30 minutes, the control period may be set to a period shorter than the stated short period. If the current period is the next control period (Yes in S21), command generator 12 moves the sequence to step S11, and performs the series of processing from step S11 again. However, if the current period is not the next control period (No in S21), command generator 12 returns the sequence to step S21 and stands by until the next control period.

Note that the determination of step S17 in FIG. 5 need not be made. In other words, the processing from step S18 and on may be executed each time a control command is sent.

Note that outputter 13 may send the control command and the state restoration command to the one or more target devices in the same message format. In other words, command generator 12 may generate the control command and the state restoration command using the same message format.

Note, however, that steps S13 to S16 and steps S17 to S20 may be performed in parallel.

Operations by energy control system 1 will be described next with reference to FIG. 6. FIG. 6 is a sequence chart illustrating operations by energy control system 1 (an energy resource control method) according to the present embodiment. FIG. 6 illustrates a control method performed when the one or more power services include a first power service and a second power service. It is assumed that the first power service starts before the time at which the second power service starts, and ends after the second power service ends. The second power service is a power service for which the ending time occurs during the control period of the first power service. The first power service is an example of an other power service, and the second power service is an example of one power service.

First target device 21 is an energy resource installed at user household 20, and participates in both the first power service and the second power service. In other words, user household 20 participates in both the first power service and the second power service. Second target device 31 is an energy resource installed at user household 30, and of the first power service and the second power service, participates in only the second power service. In other words, of the first power service and the second power service, user household 30 participates in only the second power service. First target device 21 and second target device 31 are examples of the one or more energy resources.

Time t1 in the drawing indicates the starting time of the first power service, time t2 indicates the starting time of the second power service, time t3 indicates the ending time of the second power service, and time t4 indicates the ending time of the first power service. Time passes in order from time t1, to t2, to t3, and then to t4. The period from time t1 to time t4 is the control period of the first power service, and time t2 to time t3 is the control period of the second power service. Note that the second power service may be a power service for which the starting time is set to be before time t1.

The first power service is a power service that is implemented for a long period of time or continually, such as peak shaving, for example. The second power service is a power service that is implemented only for a period of about several hours, such as demand response (e.g., three hours for the tertiary adjusting power (2) in the supply-demand adjustment market).

First, the first power service is started at time t1. When the operations illustrated in FIG. 5 are executed at time t1, energy resource control device 10 generates a first control command according to the first power service for first target device 21, and sends the generated first control command to first target device 21.

As a result, energy resource control device 10 can control first target device 21 according to the first power service. Note that second target device 31, which is not participating in the first power service, is not selected in step S14 in FIG. 5, and thus at time t1, a control command according to the first power service is not sent to second target device 31.

Energy resource control device 10 sends the first control command to first target device 21 every control period until time t 2. Note that if there is no change in the details of the control from the previous first control command, the first control command need not be sent. This makes it possible for energy resource control device 10 to reduce the amount of communication between energy resource control device 10 and the target devices.

Next, the second power service is started at time t2. When the operations illustrated in FIG. 5 are executed at time t2, energy resource control device 10 generates a second control command according to the first power service and the second power service for first target device 21, sends the generated second control command to first target device 21, generates a third control command according to the second power service for second target device 31, and sends the generated third control command to second target device 31. It can also be said that energy resource control device 10 switches the control command sent to first target device 21 from the first control command to the second control command at time t2. The first control command and the second control command are control commands that are sent to the same destination and that have different operation modes, command values, or both.

As a result, energy resource control device 10 can control first target device 21 according to the first power service and the second power service, and can control second target device 31 according to the second power service.

Energy resource control device 10 selects first target device 21 and second target device 31 as the energy resources to be controlled in step S14 executed at time t2. If the target device is participating in at least one power service among the plurality of power services underway, energy resource control device 10 selects that target device as the energy resource to be controlled.

Then, in step S15, energy resource control device 10 sets the operation mode and command value according to the first power service and the second power service for first target device 21, and sets the operation mode and command value according to the second power service for second target device 31.

Figure 6:
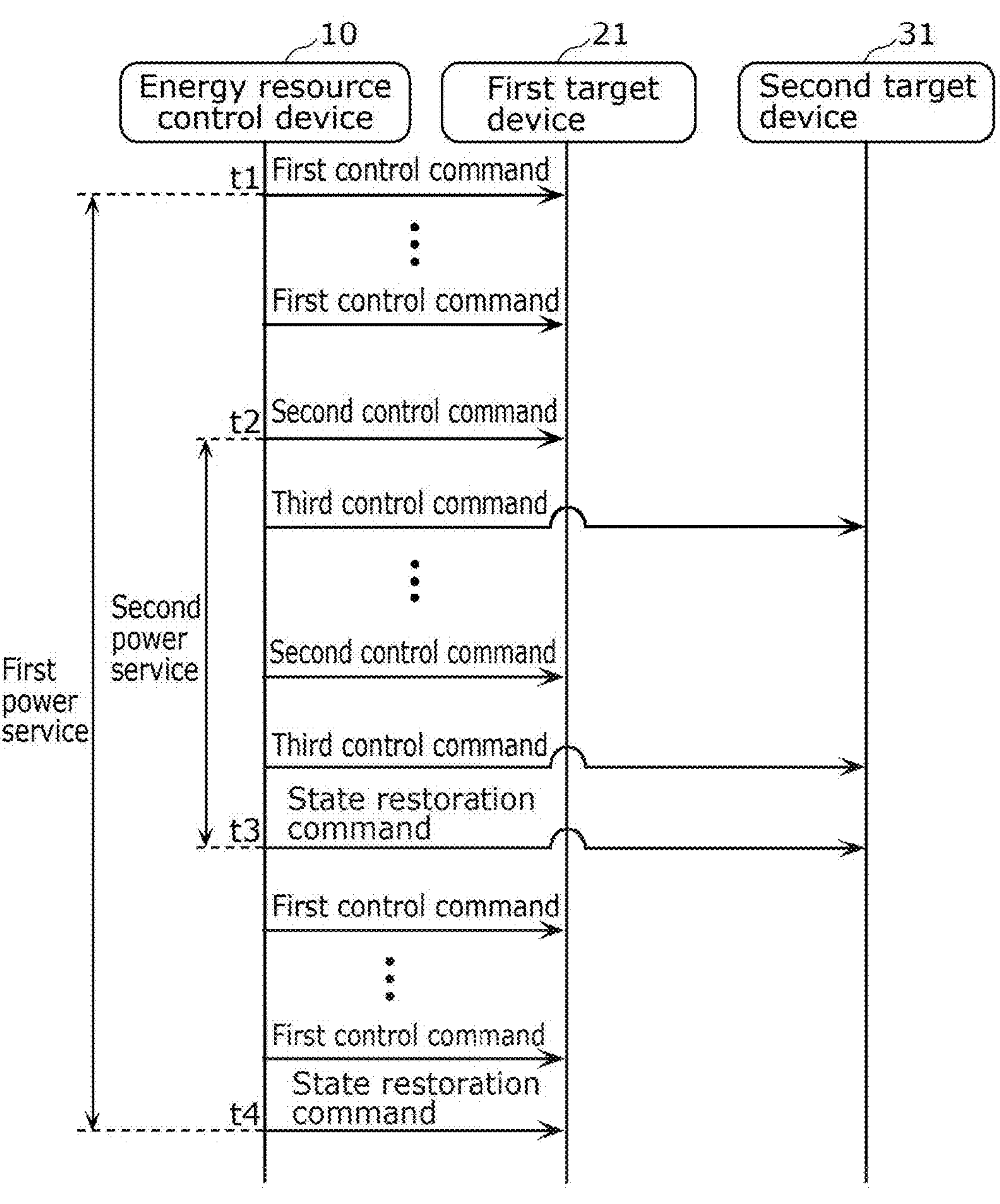
FIG. 6 is a sequence chart illustrating operations by the energy control system according to the embodiment.

For the sake of simplicity, FIG. 6 illustrates the second control command and the third control command as being sent at different timings, but in fact, the second control command and the third control command are sent at the same timing. Note that the selection processing may be performed according to a priority, such as sending the control command which has the higher command value among the second control command and the third control command first.

In each control period from time t2 to time t3, energy resource control device 10 sends the second control command to first target device 21, and sends the third control command to second target device 31.

Next, the second power service ends at time t3. When the operations illustrated in FIG. 5 are executed at time t3, energy resource control device 10 generates a first control command according to the first power service for first target device 21, and sends the generated first control command to first target device 21. In step S15 executed at time t 3, energy resource control device 10 sets, for first target device 21, the operation mode and command value according to the first power service for which the control period is continuing. In addition, in step S14 executed at time t3, the power service in which second target device 31 is participating is not underway, and thus energy resource control device 10 does not select second target device 31 as the energy resource to be controlled.

If time t3 is the timing at which the state restoration command is to be sent (Yes in S17), in step S18, energy resource control device 10 selects second target device 31 as the energy resource for which the state is to be restored. Energy resource control device 10 determines that second target device 31, which is a device for which the power service in which the device is participating is not underway and to which a state restoration command has not been sent, to be the energy resource for which the state is to be restored. In addition, in step S18 executed at time t3, energy resource control device 10 determines that first target device 21, which is a device for which at least one of the power services in which the device is participating is underway, is not an energy resource for which the state is to be restored.

Then, in step S19, from first target device 21 and second target device 31, energy resource control device 10 generates a state restoration command only for second target device 31 selected in step S18.

As a result, the state restoration command is not sent to first target device 21, and thus energy resource control device 10 can suppress a situation in which control according to the first power service ends while the first power service is underway for first target device 21. In addition, because the state restoration command is sent to second target device 31, energy resource control device 10 can end the control according to the second power service for second target device 31. Accordingly, energy resource control device 10 can appropriately end control under the desired control conditions. At or after time t3, second target device 31 operates in one of a standby state, an automatic operation state, or a state opposite from the control command obtained at time t2 to time t3 until the next control command is obtained from energy resource control device 10.

Next, the first power service ends at time t4. In addition, at time t4, by executing the operations illustrated in FIG. 5, energy resource control device 10 does not select first target device 21 as an energy resource to be controlled in step S14, because the power service in which first target device 21 is participating is not underway. If time t4 is the timing at which the state restoration command is to be sent (Yes in S17), in step S18, energy resource control device 10 selects first target device 21 as the energy resource for which the state is to be restored. Energy resource control device 10 determines that first target device 21, which is a device for which the power service in which the device is participating is not underway and to which a state restoration command has not been sent, to be the energy resource for which the state is to be restored.

Then, in step S19, from first target device 21 and second target device 31, energy resource control device 10 generates a state restoration command only for first target device 21 selected in step S18.

Through this, because the state restoration command is sent to first target device 21, energy resource control device 10 can end the control according to the first power service for first target device 21. Accordingly, energy resource control device 10 can appropriately end control for first target device 21 under the desired control conditions. At or after time t4, first target device 21 operates in one of a standby state, an automatic operation state, or a state opposite from the control command obtained at time t1 to time t4 until the next control command is obtained from energy resource control device 10.

3. Effects, Etc.

As described above, the energy resource control method according to the present embodiment is an energy resource control method for providing two or more power services for adjusting a power value of one or more energy resources to a target power value. The two or more power services include one power service and an other power service different from the one power service. The energy resource control method includes: generating a control command for controlling the one or more energy resources (S15); setting a restoration state for the one or more energy resources at or after an ending time of the one power service among the two or more power services, and generating a state restoration command for controlling the one or more energy resources in the restoration state set (S19); and sending the state restoration command generated in the generating of the state restoration command to the one or more energy resources after sending the control command generated in the generating of the control command to the one or more energy resources (S16, S20). Then, in the generating of the state restoration command (S19), the state restoration command is generated for an energy resource, among the one or more energy resources, that is not participating in the other power service at the ending time.

Through this, a state restoration command is not sent for energy resources participating in a power service different from the first power service. Therefore, according to the energy resource control method, the control command-based control of energy resources not participating in the different power service can be ended at the ending time of the first power service, which makes it possible to appropriately end the control under the desired control conditions.

Additionally, the other power service includes a power service that adjusts a power at a power receiving point of a facility where the one or more energy resources are installed to be no greater than a predetermined power value. Then, in the generating of the state restoration command (S19), generating the state restoration command for the one or more energy resources is skipped when the other power service is provided to the one or more energy resources installed in the facility.

Through this, when the first power service ends, energy resource control device 10 does not generate a state restoration command for energy resources participating in the second power service, which is underway continually or for an extended period of time. In other words, situations where the second power service ends in response to a state restoration command can be suppressed for those energy resources. Therefore, according to the energy resource control method, the control under the desired control conditions can be ended appropriately, in a more reliable manner.

Additionally, in the generating of the state restoration command (S19), when the one or more energy resources include a secondary battery, at least one of a standby state, an automatic operation state in which local control is performed, or a state opposite from the control command generated in the generating of the control command (S15), is set as the restoration state for the secondary battery.

Through this, energy resources can be restored to one of a standby state, an automatic operation state, or a state opposite from the control command, which improves the convenience of the energy resource control method.

Additionally, in the generating of the state restoration command (S19), when the state opposite from the control command generated in the generating of the control command (S15) is set as the restoration state, a value for at least one of an input or an output of power (input/output power) in the restoration state is further set, and the state restoration command that includes the value set is generated.

Through this, if the restoration state is the state opposite from the control command, the state of the energy resource after the end of the power service can be set to the desired state, which further improves the convenience of the energy resource control method.

Additionally, in the generating of the state restoration command (S19), when the one or more energy resources include a device having a thermal storage function, an automatic operation state in which local control is performed is set as the restoration state for the device.

This makes it possible to boil water when the temperature of the water in the device is low. For example, situations which negatively impact users' lives, such as when hot water cannot be used, due to participation in the power service can be suppressed.

Additionally, in the sending (S16, S20), the control command and the state restoration command are sent to the one or more energy resources in a same message format.

Through this, the control command and the state restoration command can be sent using a common message format. This makes it possible to send the commands more easily than when the control command and the state restoration command have different message formats.

The energy resource control method further includes receiving measurement data obtained by measuring at least one of a power at a power receiving point of a facility where the one or more energy resources are installed or an input/output power of the one or more energy resources, from the one or more energy resources installed in the facility or from a controller that controls the one or more energy resources (S11). Then, in the generating of the control command (S15), the control command is generated using at least the measurement data.

Through this, the control command is generated based on the measurement data, and thus according to the energy resource control method, the details of the control command (e.g., the operation mode and the command value) can be set more appropriately.

Additionally, as described above, energy resource control device 10 (an example of a control device) according to the present embodiment is a control device for providing two or more power services for adjusting a power value of one or more energy resources to a target power value. The two or more power services include one power service and an other power service different from the one power service. Energy resource control device 10 includes: command generator 12 (an example of a control command generator) that generates a control command for controlling the one or more energy resources; command generator 12 (an example of a state restoration command generator) that sets a restoration state for the one or more energy resources at or after an ending time of the one power service among the two or more power services, and generates a state restoration command for controlling the one or more energy resources in the restoration state set; and outputter 13 (an example of a command sender) that sends the state restoration command generated by command generator 12 to the one or more energy resources after sending the control command generated by command generator 12 to the one or more energy resources. Then, command generator 12 generates the state restoration command for an energy resource, among the one or more energy resources, that is not participating in the other power service at the ending time. Additionally, as described above, a recording medium according to the present embodiment is a non-transitory computer-readable recording medium having recorded thereon a program for causing a computer to execute the above-described energy resource control method.

Through this, the same effects as the above-described energy resource control method can be achieved.

Other Embodiments

Although an energy resource control method and the like according to the present invention have been described thus far on the basis of an embodiment, the present invention is not limited to the foregoing embodiment.

For example, although the foregoing embodiment describes an example in which the command generator generates the control command based on the measurement data, the configuration is not limited thereto. For example, when providing a desired power service, the command generator may generated the control command based on the details of the desired power service.

Although the foregoing embodiment described an example of outputting a control command including reducing the amount of power used as the control command, the details of the control command are not limited thereto, and may be increasing the power usage amount or increasing the power storage amount, for example. For example, if there is excess power, control such as increasing the power storage amount is performed.

Additionally, although the foregoing embodiment described an example in which the energy resource control method is performed by a server device of a resource aggregator, the configuration is not limited thereto, and the method may be performed by a server device of an aggregation coordinator, for example. Additionally, the energy resource control method according to the foregoing embodiment may be performed cooperatively by a server device of a resource aggregator and a server device of an aggregation coordinator.

Although the foregoing embodiment described an example in which the energy resource control device is constituted by a single device, the energy resource control device may be constituted by a plurality of devices. When the energy resource control device is constituted by a plurality of devices, the functions of the energy resource control device may be distributed among the plurality of devices in any manner. At least some of the functions of the energy resource control device according to the foregoing embodiment may be implemented in a user household.

The order of the plurality of processes described in the foregoing embodiment and the like is an example. The order of the plurality of processes may be changed, and at least some of the plurality of processes may be executed in parallel.

Additionally, the divisions of the function blocks in the block diagrams are merely examples, and a plurality of function blocks may be realized as a single function block, a single function block may be divided into a plurality of function blocks, or some functions may be transferred to other function blocks. Additionally, the functions of a plurality of function blocks having similar functions may be processed by a single instance of hardware or software, in parallel or time-divided.

Additionally, in the foregoing embodiment and the like, the constituent elements are constituted by dedicated hardware. However, the constituent elements may be realized by executing software programs corresponding to those constituent elements. Each constituent element may be realized by a program executing unit such as a processor reading out and executing a software program recorded into a recording medium such as a hard disk or semiconductor memory. The processor is constituted by one or more electronic circuits including a semiconductor integrated circuit (IC) or a large-scale integrated circuit (LSI). The plurality of electronic circuits may be integrated on a single chip or may be provided on a plurality of chips. The plurality of chips may be provided in a single device or may be distributed throughout a plurality of devices.

"System LSI" refers to very-large-scale integration in which multiple processing units are integrated on a single chip, and specifically, refers to a computer system configured including a microprocessor, read-only memory (ROM), random access memory (RAM), and the like. A computer program is stored in the ROM. The system LSI circuit realizes the functions of the devices by the microprocessor operating in accordance with the computer program.

Note that although the term "system LSI" is used here, other names, such as IC, LSI, super LSI, ultra LSI, and so on may be used, depending on the level of integration. Further, the manner in which the circuit integration is achieved is not limited to LSIs, and it is also possible to use a dedicated circuit or a general purpose processor. It is also possible to employ a Field Programmable Gate Array (FPGA) which is programmable after the LSI circuit has been manufactured, or a reconfigurable processor in which the connections and settings of the circuit cells within the LSI circuit can be reconfigured.

Note that in the foregoing embodiment, the comprehensive or specific aspects may be realized by a system, a method, an integrated circuit, a computer program, or a non-transitory computer-readable recording medium such as a CD-ROM, or may be implemented by any desired combination of systems, devices, methods, integrated circuits, computer programs, and recording media. The program may be a computer program that causes a computer to execute the characteristic steps included in the energy resource control method.

Furthermore, aspects of the present invention may be realized as a computer-readable non-transitory recording medium in which such a program is recorded. For example, such a program may be recorded in the recording medium and distributed or disseminated. For example, by installing a distributed program in a device having another processor and causing the processor to execute the program, the device can perform each of the processes described above. Note that the program may be stored in advance in a recording medium, or may be supplied to the recording medium via a wide-area communication network including the Internet.

Additionally, embodiments achieved by one skilled in the art making various conceivable variations on the embodiments, embodiments achieved by combining constituent elements and functions from the embodiments as desired within a scope which does not depart from the spirit of the present invention, and the like are also included in the present invention.

Supplementary Notes

The following techniques are disclosed by the descriptions in the foregoing embodiment and the like.

Technique 1

An energy resource control method for providing two or more power services for adjusting a power value of one or more energy resources to a target power value, the two or more power services including one power service and an other power service different from the one power service, the energy resource control method including:

generating a control command for controlling the one or more energy resources;

setting a restoration state for the one or more energy resources at or after an ending time of the one power service among the two or more power services, and generating a state restoration command for controlling the one or more energy resources in the restoration state set; and sending the state restoration command generated in the generating of the state restoration command to the one or more energy resources after sending the control command generated in the generating of the control command to the one or more energy resources, wherein in the generating of the state restoration command, the state restoration command is generated for an energy resource, among the one or more energy resources, that is not participating in the other power service at the ending time.

Technique 2

The energy resource control method according to Technique 1, wherein the other power service includes a power service that adjusts a power at a power receiving point of a facility where the one or more energy resources are installed to be no greater than a predetermined power value, and in the generating of the state restoration command, generating the state restoration command for the one or more energy resources is skipped when the other power service is provided to the one or more energy resources installed in the facility.

Technique 3

The energy resource control method according to Technique 1 or 2, wherein in the generating of the state restoration command, when the one or more energy resources include a secondary battery, at least one of a standby state, an automatic operation state in which local control is performed, or a state opposite from the control command generated in the generating of the control command, is set as the restoration state for the secondary battery.

Technique 4

The energy resource control method according to Technique 3, wherein in the generating of the state restoration command, when the state opposite from the control command generated in the generating of the control command is set as the restoration state, a value for at least one of an input or an output of power in the restoration state is further set, and the state restoration command that includes the value set is generated.

Technique 5

The energy resource control method according to any one of Techniques 1 to 4, wherein in the generating of the state restoration command, when the one or more energy resources include a device having a thermal storage function, an automatic operation state in which local control is performed is set as the restoration state for the device.

Technique 6

The energy resource control method according to any one of Techniques 1 to 5, wherein in the sending, the control command and the state restoration command are sent to the one or more energy resources in a same message format.

Technique 7

The energy resource control method according to any one of Techniques 1 to 6, further including:

receiving measurement data obtained by measuring at least one of a power at a power receiving point of a facility where the one or more energy resources are installed or an input/output power of the one or more energy resources, from the one or more energy resources installed in the facility or from a controller that controls the one or more energy resources, wherein in the generating of the control command, the control command is generated using at least the measurement data.

Technique 8

A control device that provides two or more power services for adjusting a power value of one or more energy resources to a target power value, the two or more power services including one power service and an other power service different from the one power service, the control device including:

a control command generator that generates a control command for controlling the one or more energy resources;

a state restoration command generator that sets a restoration state for the one or more energy resources at or after an ending time of the one power service among the two or more power services, and generates a state restoration command for controlling the one or more energy resources in the restoration state set; and a command sender that sends the state restoration command generated by the state restoration command generator to the one or more energy resources after sending the control command generated by the control command generator to the one or more energy resources, wherein the state restoration command generator generates the state restoration command for an energy resource, among the one or more energy resources, that is not participating in the other power service at the ending time.

Technique 9

A non-transitory computer-readable recording medium having recorded thereon a program that causes a computer to execute the energy resource control method according to any one of Techniques 1 to 7.

REFERENCE SIGNS LIST

10 Energy resource control device (control device)

11 Obtainer

12 Command generator (control command generator, state restoration command generator)

13 Outputter (command sender)

21, 31 Target device (energy resource)

The invention claimed is:

1. An energy resource control method for providing two or more power services for adjusting a power value of one or more energy resources to a target power value, the two or more power services including one power service and an other power service different from the one power service, the energy resource control method comprising:

generating a control command for controlling the one or more energy resources;

setting a restoration state for the one or more energy resources at or after an ending time of the one power service among the two or more power services, and generating a state restoration command for controlling the one or more energy resources in the restoration state set; and sending the state restoration command generated in the generating of the state restoration command to the one or more energy resources after sending the control command generated in the generating of the control command to the one or more energy resources, wherein in the generating of the state restoration command, the state restoration command is generated for an energy resource, among the one or more energy resources, that is not participating in the other power service at the ending time, and the state restoration command is not generated for an energy resource, among the one or more energy resources, on which control according to the two or more power services including the one power service is being performed at the ending time.

2. The energy resource control method according to claim 1, wherein the other power service includes a power service that adjusts a power at a power receiving point of a facility where the one or more energy resources are installed to be no greater than a predetermined power value, and in the generating of the state restoration command, generating the state restoration command for the one or more energy resources is skipped when the other power service is provided to the one or more energy resources installed in the facility.

3. The energy resource control method according to claim 1, wherein in the generating of the state restoration command, when the one or more energy resources include a secondary battery, at least one of a standby state, an automatic operation state in which local control is performed, or a state opposite from the control command generated in the generating of the control command, is set as the restoration state for the secondary battery.

4. The energy resource control method according to claim 3, wherein in the generating of the state restoration command, when the state opposite from the control command generated in the generating of the control command is set as the restoration state, a value for at least one of an input or an output of power in the restoration state is further set, and the state restoration command that includes the value set is generated.

5. The energy resource control method according to claim 1, wherein in the generating of the state restoration command, when the one or more energy resources include a device having a thermal storage function, an automatic operation state in which local control is performed is set as the restoration state for the device.

6. The energy resource control method according to claim 1, wherein in the sending, the control command and the state restoration command are sent to the one or more energy resources in a same message format.

7. The energy resource control method according to claim 1, further comprising:

receiving measurement data obtained by measuring at least one of a power at a power receiving point of a facility where the one or more energy resources are installed or an input/output power of the one or more energy resources, from the one or more energy resources installed in the facility or from a controller that controls the one or more energy resources, wherein in the generating of the control command, the control command is generated using at least the measurement data.

8. A control device that provides two or more power services for adjusting a power value of one or more energy resources to a target power value, the two or more power services including one power service and an other power service different from the one power service, the control device comprising:

one or more memories; and at least one processor coupled to at least one of the one or more memories and configured to perform operations comprising:

generating a control command for controlling the one or more energy resources;

setting a restoration state for the one or more energy resources at or after an ending time of the one power service among the two or more power services;

generating a state restoration command for controlling the one or more energy resources in the restoration state set; and sending the state restoration command to the one or more energy resources after sending the control command to the one or more energy resources, wherein the generating of the state restoration command comprises generating the state restoration command for an energy resource, among the one or more energy resources, that is not participating in the other power service at the ending time, and the state restoration command is not generated for an energy resource, among the one or more energy resources, on which control according to the two or more power services including the one power service is being performed at the ending time.

9. A non-transitory computer-readable recording medium having recorded thereon a program for causing a computer to execute the energy resource control method according to claim 1.

10. The energy resource control method according to claim 1, wherein, for an energy resource participating in the other power service at the ending time, a command for shifting the energy resource to the restoration state is not generated and a control command according to the other power service for which a control period is continuing is generated.

11. The energy resource control method according to claim 1, further comprising:

selecting, from a plurality of energy resources, the one or more energy resources that are participating in at least one power service among the two or more power services being executed and are capable of executing the power service, as one or more target energy resources, wherein in the generating of the control command, the control command for controlling the one or more target energy resources is generated.

12. The control device according to claim 8, wherein, for an energy resource participating in the other power service at the ending time, a command for shifting the energy resource to the restoration state is not generated and a control command according to the other power service for which a control period is continuing is generated.

13. The control device according to claim 8, wherein the operations further comprise selecting, from a plurality of energy resources, the one or more energy resources that are participating in at least one power service among the two or more power services being executed and are capable of executing the power service, as one or more target energy resources, wherein in the generating of the control command, the control command for controlling the one or more target energy resources is generated.

* * * * *